United States Patent [19]

Kenney

[11] Patent Number: 4,484,029
[45] Date of Patent: Nov. 20, 1984

[54] CORDLESS TELEPHONE SWITCH AND LINE SELECTOR

[76] Inventor: David S. Kenney, 431 W. Main St., Kutztown, Pa. 19530

[21] Appl. No.: 527,323

[22] Filed: Aug. 29, 1983

[51] Int. Cl.³ .......................... H04Q 7/04; H04M 1/05
[52] U.S. Cl. .............................. 179/2 EA; 179/156 A; 455/89
[58] Field of Search ................. 179/2 E, 2 EA, 2 EB, 179/2 EC, 156 A, 156 R; 455/89, 90

[56] References Cited

U.S. PATENT DOCUMENTS

| | | | |
|---|---|---|---|
| 3,549,831 | 12/1970 | Forney | 179/156 A |
| 3,621,156 | 11/1971 | Kliewer | 179/156 A X |
| 3,889,190 | 6/1975 | Palmer | 179/156 A X |
| 4,039,765 | 8/1977 | Tichy et al. | 179/156 A |

Primary Examiner—Stafford D. Schreyer
Assistant Examiner—W. J. Brady
Attorney, Agent, or Firm—Leonard Michael Quittner

[57] ABSTRACT

In a cordless, head mounted telephone set a means of powering the radio transmission and reception unit and selecting telephone lines is provided by ganging the power and selecting switch thereof to the rotation of the microphone mouth piece.

6 Claims, 5 Drawing Figures

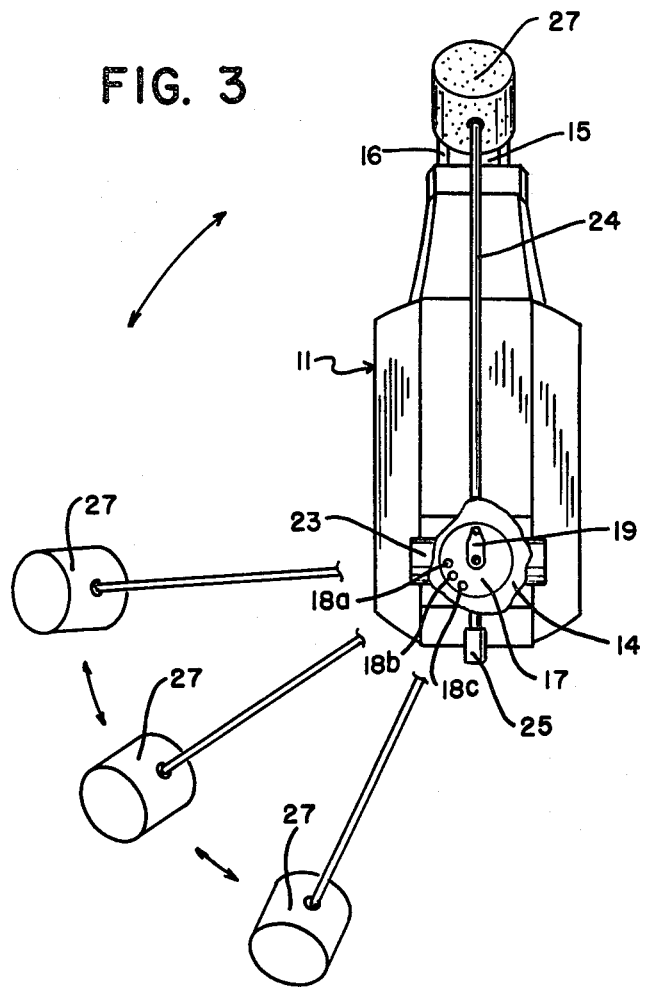
FIG. 3
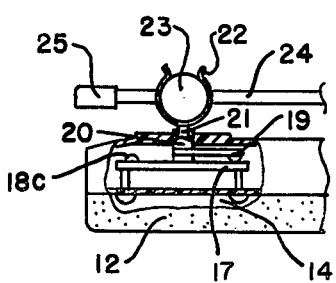
FIG. 4
FIG. 5

CORDLESS TELEPHONE SWITCH AND LINE SELECTOR

CROSS-REFERENCE

There are no cross-references to, nor are there any, related applications.

FEDERALLY SPONSORED RIGHTS

The invention herein was made without any federal sponsorship or contribution.

BACKGROUND OF THE INVENTION

1. The Field of the Invention

The field of the invention relates to an improvement in cordless telephone sets and more particularly the means by which such a set makes connection with a limited range radio base station which is wired to a conventional telephone station for the purpose of making the set, in effect, a low power radio transmitter/receiver and simultaneously an improved means of selecting different telephone lines. The term "cordless" is used herein to distinguish the field of invention from the more general field of wireless telephony which encompasses the use of powerful radio devices and has considerably different problems not the least of which is transmission and reception over relatively long distances.

2. DESCRIPTION OF PRIOR ART

The background art of the invention reveals remarkable advances in consumer-oriented telephone hand sets which are cord-free. Conventionally, a modification is made at the telephone station during installation by attaching thereto a so-called radio base station which is activated by telephone switching devices to allow duplexing and to enable an individual to receive or to make telephone calls through a cordless hand set by means of radio signals picked up at the hand set or sent therefrom to the base.

The convenience to the user is obvious and the great commercial, popular demand for this kind of product demonstrates the utility of thereof.

Recently, as set forth for example in Popular Science Magazine, August, 1983, p. 23, attempts have been made to convert a hand-held cordless telephone set to one which may be worn by the user as a headset. Some models currently available show portions of the apparatus fitted conventionally to the head by means of an arctuate band-like arrangement of metal or plastic conforming to the contour of the head, upon which arrangement are located an earphone and a microphone containing mouthpiece on an arm generally in a fixed position adjacent to the mouth of the user. A small swivel adjustment is sometimes made available at the base of the mouthpiece arm permitting small relocations thereof relative to the mouth to improve transmission quality and user comfort. The radio unit portion of the set in this mode is worn on the waist, as for example, by means of a belt, and connected to the headset portion by means of wires. The power switch is typically located on the belt-worn portion of the radio unit and is operated manually, typically by means of a push button.

The problems encountered by the configuration so disclosed are relate to convenience and accessability. The power switch may be at times inaccessable to the user by virtue of his position or because it is not locatable without lowering the eyes, thereby diverting the attention visually, and the mouthpiece is continually in front of the face, obstructing it and the lower field of vision when the telephone is not in use. Additionally, rapid, easily accessable means for selecting different telephone lines are not provided.

The present invention obviates the difficulties above-disclosed and provides a simple, inexpensive modification to cordless telephone headsets by providing an uncomplicated, foolproof means of making the telephone set connect with and select telephone lines while simultaneously providing a simple means for relocating the mouthpiece entirely away from the face while automatically disconnecting the radio unit, but leaving the whole apparatus continuously accessible.

By way of example, and not limitation, in addition to the more obvious, ordinary implementations, the inventive improvement herein disclosed has great utility in areas where it is desirable for the user to maintain telephone communication while in a confined space or where his field of vision should not be impaired unnecessarily. Structural construction workers, marine vessel operators, vehicle drivers, warehouse personnel, and even forward observers in military situations will benefit substantially from the convenience and accessability provided by this invention.

SUMMARY OF THE INVENTION

The invention may be summarized as providing a mouthpiece arm of a headset with a pivot means at an end opposite the mouthpiece such that the rotation of the mouthpiece arm upward will locate the mouthpiece and the microphone therein contained superiorly to the head and away from the face and visual field, and simultaneously and automatically therewith disconnect the radio portion. This is accomplished by ganging the pivot means to a circular, wiper-containing rotary wafer power switch which is so configured that the radio circuit is in a disconnected or "off" mode when the mouthpiece is so superiorly disposed. Rotationally lowering the arm to the vicinity of the mouth will automatically rotate the wafer power switch wiper away from its "off" position, toward a positive stop "on" position, connect the microphone, power the radio and make telephone line selection in one simple gesture. It is important to note that the rotation causes the mouthpiece to describe a sufficient arc to bring it in line with the mouth. The wafer power switch "on" contact points being set on an equivalent arc segment of the perimeter of the wafer switch will allow completion of the connection and permit voice transmission when the wiper is rotated through the same arc. Improvements obvious to one skilled in the art will immediately occur such as creating of further adjustment of the mouthpiece over a powered segment of the wafer arc by jumping the contact points in that vicinity together thereby reducing the number of telephone lines available for use, or forming the antenna into the arctuate headband or mounting the radio unit adjacent to the earphone instead of on a belt about the waist.

DESCRIPTION OF THE DRAWINGS

The present invention may better be understood and its numerous objects and advantages will become apparent to those skilled in the art by reference to the drawings wherein like reference numerals refer to like elements among the figures. There are two (2) sheets of drawings accompanying this application. Reference is made to FIG. 1, which shows the headset being worn with the mouthpiece arm rotated to an upright position with the radio unit disconnected or "off".

FIG. 3 is a view and

FIG. 4 is a segmented view of the head set arrangement showing the rotational relationship between the mouthpiece arm, the pivot means and the rotary wafer power switch.

FIG. 5, is an electrical schematic diagram of a mode of wiring the switch and telephone line selector points.

DESCRIPTION OF THE PREFERRED EMBODIMENT

Figure 1:
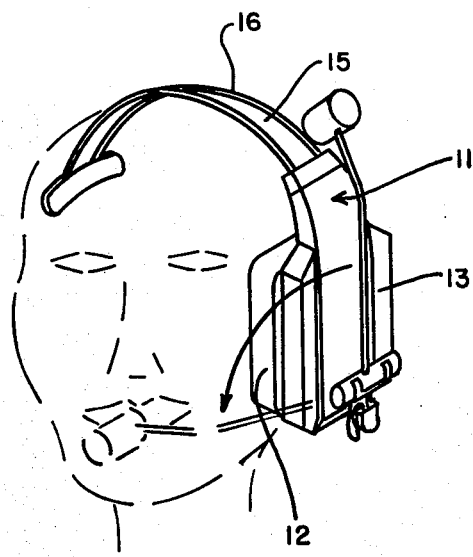
Figure 2:
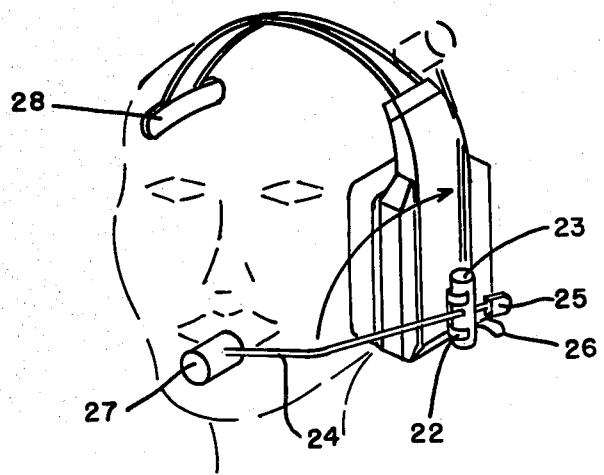
FIG. 2, shows the mouthpiece arm rotated to a downward position and the radio unit connnected or "on".

The preferred embodiment is described, wherein a curved telephone headset assembly [11] is formed consisting at one end of an ear phone [12] on top of whose outer face is disposed a lower face of a housing [13] containing a battery powered [B=] radio transmitting and receiving unit [14]. Onto a side face of the housing is connected an arctuate band [15] of resilient material in which is included along its arc an antenna [16] of appropriate length and material such that it is matched to the transmitting and receiving characteristics of the radio unit. The radio unit's power is controlled by a circular rotary wafer switch [17] located within the housing, the switch being equipped with a plurality of electrical contact points [18a, 18b, 18c] along the perimeter thereof, each contact point by its configuration representing a positive stop position, and an electrically powered wiper [19] which moves at an inner end pivotally in conjunction with a rotating stem [20] centrally disposed on the wafer such that the wiper can, by its rotational position make or break an electrical connection as it makes a stop. The wiper has an outer end which is indented and slides onto, or positively stops at, any of the contact points. The stem has an upper insulated portion [21] which protrudes through the housing. Disposed upon stem outside the housing, are spring clips [22] which hold an insulated rod [23] having a circular passage centrally disposed therethrough perpendicular to the longitudinal axis of the rod into which is fitted slidably and adjustably a mouthpiece arm [24]. The mouthpiece arm has at one end thereof an insulated jack [25] through which an electrical connection to the radio unit may be made [26] and at another end of said arm a mouthpiece containing a microphone [27] such that the microphone is electrically connected to the jack.

A user of the assemblage fits it upon his head holding it in place by the earphone over an ear and a keeper [28] disposed on the other side of his head such that the mouthpiece will rotate in an arc in front of his face. The rotary power switch is so wired that when the mouthpiece arm is rotated such that the mouthpiece end is located superiorly to the head, no electrical contact is made by the radio unit with its power source and the radio is in an "off" position. When the mouthpiece arm is rotated inferiorly from the head forward of the face to a position at least perpendicular to the user's mouth typically describing an arc of 105°-130° preferably of 120° the rotation will simultaneously therewith rotate the wiper a similar number of degrees along the perimeter of the power switch to one of the positive stop electrical contact points located therein [18a, b,c,] such that the radio is powered "on" at each stop. Transmission is made through the microphone and reception is had through the earphone. By electrically connecting each contact point located on the perimeter of the wafer switch to a separate radio transmission channel within the radio unit the user is enabled with a small hand gesture to communicate differentially through a choice of telephone lines in accordance with the radio unit's configuration.

What is claimed is:

1. In a cordless telephone headset having a housing and radio transmitter/receiver unit mounted therein in radio communication with a radio base station in contact with a telephone line, a power switch therein and a microphone in combination therewith comprising;
    (a) a circular rotary wafer power switch inside the housing with an off position and a positive stop contact point which is an on position angularly displaced from said off position on an outer perimeter of said circular switch said power switch having;
    (b) a wiper whose outer end has an indentation formed therein which end rotably and slidably contacts the positive stop contact point to create an on position and whose inner end is attached to a rotatable stem centrally located on the wafer portion of the switch said stem having above the wiper an insulated portion extending outward of the housing upon which are mounted spring clips which hold
    (c) an insulated rod having a central passage passing perpendicularly through the rod's longitudinal axis in which is slidably and adjustably inserted
    (d) a mouthpiece arm whose first end is fitted with a mouthpiece containing a microphone which microphone is electrically connected to a second end which is fitted with a jack which jack is electrically connected to the radio unit such that
        (i) when the wafer power switch is in the "off" position, the mouthpiece arm is planarly parallel to a longitudinal axis of a human head upon which is fitted the headset and the mouthpiece is located superiorly to the head and such that
        (ii) when the mouthpiece arm is rotated inferiorly and forwardly anterior of the head to a plane at least perpendicular to said longitudinal axis, the wiper is simultaneously rotated to where it makes contact with the positive stop contact point thereby creating an "on" position by which the radio unit may transmit to and receive from the base station to a telephone line.

2. A cordless telephone headset as in claim 1, wherein when the mouthpiece arm is rotated inferiorly to at least perpendicular to the human head's mouth the radio transmitter/receiver unit is continuously on.

3. A cordless telephone headset as in claim 1, wherein the forward rotation of the mouthpiece arm anteriorly describes an arc of 105°-130° from the off position to contact with a positive stop contact point a situated similar number of degrees on the wafer perimeter from the off position.

4. A cordless telephone headset as in claim 3, wherein the rotary wafer power switch has a plurality of positive stop contact points located in said arc.

5. A cordless telephone headset as in claim 4, wherein each of the positive stop contact points is wired to a separate radio channel.

6. A cordless telephone headset as in claim 5, wherein each radio channel is in radio contact with a separate telephone line.

* * * * *